United States Patent Office 3,437,591
Patented Apr. 8, 1969

3,437,591
LIQUID POLYETHER POLYOL COMPOSITION AND PREPARATION
Janis A. Bungs, Willoughby, Ohio, assignor to Diamond Shamrock Corporation, Cleveland, Ohio, a corporation of Delaware
No Drawing. Continuation-in-part of application Ser. No. 328,201, Dec. 5, 1963. This application Mar. 1, 1965, Ser. No. 436,315
Int. Cl. C09k 3/28; C08g 41/00
U.S. Cl. 252—8.1          22 Claims

ABSTRACT OF THE DISCLOSURE

A liquid polyether polyol composition having a hydroxyl number of 25–600 is prepared by simultaneously reacting together from 0.5 to 1 mol of an organic compound containing from 39 to 72 percent chlorine, by weight; 1 mol of a polyhydroxy compound having a hydroxyl number of 150–650 and from 0.08 to 0.1 mol of a trivalent antimony compound, as antimony trioxide, antimony trisulfide, an antimonyl derivative of certain aliphatic, alpha-hydroxy organic acids or an antimonous acid ester derived by reacting, e.g., an alkylene oxide or an hydroxy compound with antimony trichloride or antimony trioxide.

---

This application is a continuation-in-part of my copending application, Ser. No. 328,201, filed on Dec. 5, 1963, and now abandoned.

This invention relates to flame-resistant urethane plastics. More particularly, it relates to a novel polyol composition having chemically incorporated therein both chlorine and antimony as flame-retarding agents, the said antimony also acting as a catalyst for the urethane reaction, and to the use of this composition in the preparation of flame-resistant urethane plastics.

It is well known in the art to prepare urethane plastic materials by reacting polyhydroxy compounds with polyisocyanates. Depending upon the manner in which they are prepared, these polyurethanes may be in the form of either cellular or non-cellular products. They may likewise vary widely from extremely soft, elastomeric products to hard, rigid articles. Because of their excellent physical and chemical properties, urethane plastics have enjoyed ever increasing use in industry. For example, cellular polyurethanes exhibiting low density coupled with excellent tensile strength find large scale application as cushioning materials and as insulating materials against the transmission of heat, sound and moisture. Non-cellular polyurethanes are especially useful as adhesives, as protective coatings and laminates and for application in the preparation of various castings and moldings.

However, most conventional polyurethanes are flammable materials, i.e., they will burn rapidly and freely when contacted with a flame. This property has, in many instances, been a deterrent to their use in applications where safety and nonflammability are of prime importance such as, for example, the use of the cellular products as insulation materials in various types of construction or in electrical equipment.

In the present invention, new and novel compositions have been prepared for use in the production of flame-retardant polyurethanes, particularly the cellular materials commonly designated in the art as "foams." Many earlier attempts to produce flame-retardant polyurethanes have comprised blending into the basic foam formulation either one or more organic or inorganic compounds as flameproofing agents. For example, an antimony compound such as antimony oxide has long been employed to impart flame resistance to urethane foams, said compound usually being incorporated and dispersed in the formulation in a finely divided state. Being significantly higher in density than the foam mixture and not being compatible therewith, the antimony compound settles out of suspension upon storage and must again be dispersed in the mixture prior to foaming operations. Antimony compounds so added to the foam formulations adversely affect the properties of the foam products. Likewise, polyhalogen compounds if not chemically bound to the polyurethane structure, will adversely affect foam properties.

More recently, foam products having more permanent flame-resistant properties have been produced by using as the polyhydroxy component of the foam formulation a halogen-containing polyester or a halogen-containing polyester-polyether mixture. However, such foam components are difficult to handle in foaming operations as they are usually very viscous liquids.

It can likewise be envisioned that non-cellular urethane plastics, e.g., coatings, adhesives, laminates, castings, moldings and the like, would similarly enjoy wider commercial use if they could be made permanently flame-resistant at no sacrifice to their excellent properties and performance.

It is an object of this invention, therefore, to provide for use in the preparation of urethane plastics, a polyhydroxy compound containing along with a percentage of halogen, e.g., chlorine, a percentage of antimony sufficient to impart flame-resistant character to the products prepared therefrom.

Another object of this invention is to provide an improved process for incorporating antimony in a urethane plastic.

A further object of this invention is to provide for use in the preparation of flame-retardant polyurethanes an antimony-containing polyhydroxy compound in which the antimony serves as a catalyst for the urethane reaction.

Still another object of this invention is to provide rigid to flexible urethane cellular or foam products having permanent flame-resistant characteristics.

A still further object of this invention is to provide a liquid halogen and antimony-containing polyhydroxy compound having such viscosity characteristics that it may be reacted easily and directly with a polyisocyanate by various foaming techniques.

Still another object of this invention is to provide flame-resistant, non-cellular urethane plastics such as coatings, laminates, castings, moldings and the like.

These and other objects of the invention will become apparent to those skilled in the art from the following description. Halogen and antimony-containing compositions reactive with polyisocyanates are prepared by reacting, at an elevated temperature, an organic polyhalogenide, a compound having a plurality of hydroxyl groups and either an organic or inorganic compound containing trivalent antimony. The reaction is carried out with heat and agitation until the antimony has been chemically incorporated into the reaction mixture, as evidenced either by solubilization of the antimony compound if initially insoluble in the reaction mixture or by the recovery of identifiable secondary reaction products from reaction of a soluble antimony material. Thereafter, depending upon the type of urethane plastic being prepared, the halogen and antimony-containing polyol product prepared may be mixed with a polyisocyanate and other components, as necessary, to prepare the flame-resistant polyurethanes desired.

The term "organic polyhalogenide" as used herein in the specification and claims is intended to refer to suitable organic compounds containing significant percentages, by weight, of either fluorine, chlorine, bromine or iodine. However, because of their ready availability and low cost, organic polychlorides are at present the preferred polyhalogenides for use in this invention. For this reason, specific reference will be made hereinafter to organic polychlorides; this is not to be taken, however, as limiting the present invention but merely as being illustrative thereof.

Suitable organic trivalent antimony compounds which may or may not be soluble initially in the reaction mixture include antimonyl derivatives of metallic and ammonium salts of aliphatic, alpha-hydroxy mono- and polybasic organic acids, e.g., potassium antimonyl tartrate, potassium antimonyl mucate, potassium antimonyl lactate, potassium antimonyl citrate, lithium antimonyl tartrate, barium antimonyl tartrate, butylamine antimonyl tartrate and the like. Organic antimony compounds suitably used herein likewise include the esters of antimonous acid prepared by reacting an epoxide or an organic hydroxy compound with antimony trichloride or antimony trioxide, such as, for example, tris(2-chloroethyl)antimonite, tris(2-chloropropyl)-antimonite, tris(2-chlorobutyl)antimonite, tris(2 - ethylhexyl)-antimonite, tris(2-octyl)antimonite, triphenyl antimonite and the like.

The inorganic trivalent antimony compounds employed herein are antimony trioxide and antimony trisulfide, with the trioxide presently being preferred for use.

The novel polyol composition obtained according to this invention which composition is a mixture of condensation products and is recovered from the reaction substantially in quantitative yield, is believed to be a result of several simultaneous and subsequent reactions effected between the organic polyhalogenide, i.e., polychloride, the hydroxyl-containing and the antimony components employed. The major or primary reaction occurring is believed to be the modified Williamson reaction in which ether type compounds are formed from the organic polyhalogenide and the hydroxyl-containing component, the antimony compound acting primarily as a scavenger for the hydrogen halogenide formed in this reaction.

As previously described, suspended solids in the reaction mixture, such as initially-insoluble antimony compounds are observed to gradually disappear during the reaction so that a homogeneous syrup product is obtained. It is believed that such initially-insoluble solids, i.e., antimony compounds are converted into organic or inorganic antimony compounds soluble or miscible with the other condensation products formed. It should be noted, however, that an insoluble antimony compound, e.g., antimony trioxide, will not react singly with either the polychloride or the hydroxyl-containing compound under similar reaction conditions. That is to say, no soluble antimony compounds are formed when separate suspensions of antimony trioxide in the polychloride and in the hydroxyl-containing compound are each subjected to the same reaction conditions as are employed to prepare the polyol composition of this invention. When these mixtures are then allowed to stand after treatment, the antimony trioxide is observed to settle out of suspension.

As recovered, the polyol composition of this invention is an easily pourable, liquid at room temperature. It does not increase in viscosity with aging. Additionally, no solids are observed to precipitate from the composition upon standing, indicating hat no insoluble auxiliary products are formed during preparation of the composition nor during its subsequent storage.

In preparing the flame-resistant polyurethane products of this invention, the polyol composition can be easily reacted with a polyisocyanate in the absence of catalysts such as are normally used to initiate the polyol-polyisocyanate cross-linking reaction. The antimony contained in the polyol acts as a catalyst for the urethane reaction. It will easily be recognized by those skilled in the art that the speed of the reaction may be varied depending upon the amount of antimony present in the polyol.

Depending upon the particular polychloride and hydroxyl-containing component, or components, used in its preparation, the polyol composition generally has an hydroxyl number ranging from about 25 up to at least 600, a chlorine content ranging from about 2 percent up to about 30 percent, by weight and an antimony content ranging from about 0.1 percent up to about 12 percent, by weight. The presently preferred polyol of this invention contains, by weight, from about 5 percent up to about 25 percent chlorine and from 0.3 percent up to about 12 percent antimony. As described hereinafter and illustrated by specific examples, the aforementioned reaction components will naturally be varied depending upon the particular end use to which the polyol composition is applied. The polychlorides which generally may be used to prepare the composition of this invention include chlorinated acyclic, isocyclic or heterocyclic organic compounds. Presently preferred compounds are the chlorinated straight-chain, branched or cyclic hydrocarbons which may be saturated or unsaturated, e.g., chlorinated paraffins or alkanes, chlorinated olefins or alkenes and chlorinated acyclic or cyclic diolefins or alkadinenes. Likewise, compounds containing other functional groups such as, for example, chlorinated ethers, may be used. However, it is required that a polychloride useful in this invention reacts primarily with the hydroxyl-containing compound and the antimony compound through its chlorine atom.

Hydroxyl-containing compounds employed herein are monomeric and polymeric polyols having at least two functional hydroxyl groups per molecule. Such compounds include polyalcohols and hydroxyl-containing polyethers, polyesters, polyesteramides and the like. Polyether polyols suitable for use may be either branch-chain or linear polyether polyols or mixtures thereof which have at least one, and preferably, a plurality of ether linkages and contain at least two functional hydroxyl groups. Branch-chain polyether polyols containing at least three and preferably up to at least eight hydroxyl groups include such compounds as the reaction products of alkylene oxides such as propylene oxide, butylene oxide, mixtures of ethylene and propylene oxides, etc. with polyhydric compounds such as glycerol; trimethylol propane, higher functional alkanolamines, butane triols, hexanetriols; tetrols, such as pentaerythritol; pentols; hexols such as sorbitol; sucrose; glycosides such as lower alkyl arabinosides, xyloside, fructoside, glucoside, rhamnoside, and the like. Suitable branch-chain polyether polyols may likewise be prepared by reacting the aforementioned alkylene oxides or mixtures thereof with alicyclic polyols such as, e.g., tetramethylolcyclohexanol; polyols containing a heterocyclic nucleus such as, e.g., 3,3,5 - tris(hydroxymethyl) - 5 - methyl-4-hydroxytetrahydrofuran or with polyhydroxy compounds containing an aromatic nucleus such as 2,2-bis(hydroxyphenyl)-ethanol, pyrogallol, phloroglucinol, tris(hydroxyphenyl)-alkanes, e.g., 1,1,3-tris(hydroxyphenyl)ethane; tetrakis-(hydroxyphenyl)alkanes, e.g., 1,1,3,3-tetrakis(hydroxy-3-methylphenyl)propane and liquid reaction products of phenol and formaldehyde and the like. In preparing the polyol composition of this invention the various polyhydric materials listed above may be combined with the polyether-polyols as well as mixtures of the polyols themselves.

Suitable linear or substantially linear polyetherpolyols are polyalkylene ether glycols obtained by polyaddition reactions, i.e., polymerization, copolymerization and the like, of alkylene oxides, glycols, heterocyclic ethers and other similar materials, either singly or in combination. Examples of such polyether polyols include the polyoxyalkylene glycols prepared by the addition of alkylene oxide to water, to alkylene glycol, or to dialkylene glycol, e.g., polyoxyethylene glycol; polyoxypropylene glycol and mixed oxyethylene-oxypropylene polyglycols prepared in a similar manner; polyether glycols prepared by reacting ethylene glycol, propylene oxide, or mixtures thereof, with mono- and poly-nuclear hydroxybenzenes, e.g., catechol, resorcinol, hydroquinone, 2,2-bis(p-hydroxyphenol) propane, bis(p-hydroxyphenol)methane and the like; polyneopentylene ether glycol, polytetramethylene ether glycol, polypentamethylene ether glycol, polyhexamethylene ether glycol, poly-1,6-heptamethylene ether glycol and the like. Additionally, polyalcohols such as the aforementioned diols, triols, tetrols and polyols, e.g., alkylene glycols, glycerine, trimethyl propane, 1,2,6-hexanetriol, pentaerythritol, etc. generally may be used in combination with these polyether polyols when preparing the novel chlorine and antimony-containing polyol composition of this invention.

Polyester polyols and polyesteramide polyols employed are formed from polyfunctional materials such as polycarboxylic acids, amino-carboxylic acids, glycols, aminoalcohols, diamines and the like. The polyesters are prepared by reacting at least two bifunctional ingredients, as a glycol and a dibasic acid. The polyesteramides are prepared by reacting a dibasic acid with a mixture comprising a glycol and an aminoalcohol or a diamine. Additionally, a wide variety of complex polyester and polyesteramide polyols may be formed by the reaction of a plurality of polyfunctional compounds as described.

In practice, the particular polyol or polyol mixture employed in combination with the organic polychloride to prepare the polyol composition of this invention will vary depending upon the particular end-use of the composition. Accordingly, polyols varying widely in average molecular weight and particularly in functionality are selected. For example, a composition having an hydroxyl number of from 250 to 600 generally is suitable for the preparation of rigid urethane foam materials, a polyol having a hydroxyl number of 300 to 450 being especially preferred. Therefore, in preparing polyol compositions for use in rigid foam applications, polymeric polyols (e.g. polyether or polyester polyols) which are of low average molecular weight and have at least three and preferably more than three functional hydroxyl groups per molecule are typically employed, said polyols being used either singly, in combination with other similar polyols and/or in combination with monomeric polyhydric materials as described above which have at least two functional hydroxy groups. For satisfactory use in the production of semi-rigid foam materials, the polyol composition should have, generally, an hydroxyl number of from 100 to 250; while a composition having an hydroxyl number of 25 to 100 is generally satisfactory for the production of flexible urethane foams. Accordingly, polyol compositions having suitable hydroxyl numbers for such applications, are typically prepared by employing, in combination with the organic polychloride, higher molecular weight polymeric polyols having 2–3 functional hydroxyl groups, either single or in combination with other similar polyols. Polyhydric materials such as polymeric diols, monomeric diols and triols, etc. generally may also be employed with these polyols.

In preparing the composition, the quantity of organic polychloride used in proportion to the hydroxyl-containing component, i.e., the polyol or mixture thereof, will be varied depending upon the particular polychloride employed and the end-use to which the polyol composition is applied. For example, in preparing a polyol for use in rigid urethane foam production, from about 0.5 to 1 mole of polychloride per mole of polyol or polyol mixture generally is satisfactory.

The quantity of antimony incorporated in the reaction likewise varies depending upon the flame-resistant properties desired in the polyurethane products. For example, an amount of antimony compound sufficient to provide up to 0.1 mole of antimony per mole of the polyol component generally has been found sufficient to impart, in combination with the incorporated chlorine, excellent flame-retardant characteristics of the polyol composition and of the plastic products prepared therefrom. Additionally, varying the quantity of antimony in the polyol composition likewise modifies the catalytic activity of the composition in the urethane reaction.

As previously described hereinabove, the polyol composition of this invention is prepared at an elevated temperature by reacting a mixture containing an organic polychloride, an hydroxyl-containing compound and an antimony compound as previously described. If an initially insoluble antimony compound, such as antimony trioxide, is employed, the reaction is conducted until the original cloudy or milky reaction mixture converts to a substantially homogeneous fluid substance, indicating that the antimony has been chemically combined. Alternatively, when a soluble antimony compound, e.g., an organic antimonite, is used, volatile secondary condensation products may be recovered and identified to indicate that the antimony has been chemically combined. In each instance, the reaction generally may be conducted at a temperature of 100° to 225° C. for a time period of from 1 to 16 hours. However, as it is desirable to conduct the reaction in a minimum time period for economy of operation, the reaction is preferably conducted for 2 to 12 hours at a temperature of 120° to 200° C.

As stated previously, the polyol composition is reacted with a polyisocyanate to prepare the polyurethane products, other ingredients being added to the basic formulation as necessary depending upon the particular product desired.

As the polyisocyanate component there generally may be used any of the polyisocyanates commercially available at the present time which have two, three or more reactive isocyanate groups. Examples of suitable polyisocyanates which may be either aliphatic or aromatic compounds include tetra- and hexamethylene diisocyanate, arylenediisocyanates and their alkylation products such as the phenylene diisocyanates, naphthylene diisocyanates, diphenyl methane diisocyanates, toluene diisocyanates, di- and triisopropyl benzene diisocyanates and triphenyl methane triisocyanate; aralkyl diisocyanates such as 1-(isocyanatophenyl)ethyl isocyanate or the xylylene diisocyanates. The aromatic polyisocyanates are particularly preferred for use since these compounds are both more reactive than the aliphatic types and are less toxic. Specific preferred polyisocyanates include polymethylene polyphenylisocyanate, toluene diisocyanate (usually available as mixed 2,4- and 2,6-isomers), crude diphenylmethane-4,4'-diisocyanate, 3,3' - dimethoxy-4,4'-diphenylene diisocyanate, 1,5-naphthyl diisocyanate and the like.

In preparing foam materials, the polyisocyanate compound generaly is used in an excess amount with respect to the polyol component, i.e., in an amount contributing generally from 1.00 to 2.00 isocyanate equivalents for each hydroxyl equivalent of the polyol employed. Preferably, from 1.00 to 1.20 isocyanate equivalents are employed for each hydroxyl equivalent of the polyol. By formulating the polyol and polyisocyanate components in the ratios as described the most desirable foam products are produced.

In foaming operations as practiced heretofore, a catalyst such as an organic tin compound, a tertiary amine or other similar type compound well known in the art generally has been required in foam formulations to initiate the reaction between the hydroxyl and polyisocyanate components. Of particular advantage in the practice of the present invention is that it is not necessary, in most instances, to employ catalysts in the foam formulation to initiate the polyol-polyisocyanate crosslinking reaction. In addition to its signficant flame-retarding activity, the polyol composition of this invention likewise serves as an efficient reaction catalyst and desirable foam products are quickly prepared from the otherwise catalyst-free foam formulation in which it is incorporated. However, conventional reaction catalysts such as described above may be used in the process so as to modify the foam reaction, if desired.

Any suitable foaming or blowing agent may be incorporated in a polyol-polyisocyanate mixture to prepare the foam products of this invention. For example, water suitably may be used, generating carbon dioxide by its reaction in the mixture with isocyanate groups. The foaming operation also can be effected by means of blowing agents such as, for example, lower molecular weight alkanes and alkenes, halogen-substituted lower molecular weight alkanes and lower molecular weight dialkyl ethers. Such compounds which vaporize at, or substantially below, the temperature of the foaming reaction mass are incorporated in the foam formulation generally in amounts ranging between 15 percent and 35 percent, by weight of the polyol component. The preferred compounds are the alkanes and especially the halo-substituted alkanes, e.g., trichlorofluoromethane, dichlorofluoromethane, dichlorotetrafluoroethane, trichlorotrifluoroethane and the like. If desired, water may be used in conjunction with the aforementioned blowing agents, being employed generally in an amount ranging up to about 10 percent, by weight of the total quantity of the polyol component, preferably up to 2 percent.

A surfactant is also usually incorporated in foam formulations as a foam stabilizer, i.e., to aid in the development of fine cell structure and uniform density and also to keep the said cell structure from disintegrating before it has been strengthened by curing. Suitable surfactants include salts of long chain fatty acids, salts of sulfates or sulfonates of high molecular weight organic compounds, non-ionic compounds such as the reaction products of ethylene oxide with a long-chain alcohol, an acid or amine or with an alkyl-phenol, and liquid polydialkylsiloxanes and polysiloxane-polyalkylene oxide block copolymers.

In the foam formulation it may be advantageous, in some instances, to also employ a polyhydric compound or compounds, in addition to the polyol composition of this invention. These materials provide additional hydroxyl groups for cross-linking with isocyanate groups and forming the best foam network or structure. Suitable polyhydric components are, for example, monomeric diols, triols and polyols such as are listed hereinbefore, e.g., alkane or alkylene glycols, glycerol, pentaerythritol, etc. The polyol composition of this invention may also be blended in formulating with conventional polymeric polyols so as to provide products exhibiting varying properties and flame-resistant characteristics. It is also to be understood that in foam formulations, the polyol composition may be blended with phosphorus-containing hydroxy compounds without departing from the intended scope of this invention.

The novel polyol composition of this invention is easily soluble and miscible with additional amounts of organic polychlorides. Thus, by blending the composition with such materials as well as with polyols as described above, it is possible to adjust the chlorine content of the composition as well as its hydroxyl number. Accordingly, compositions containing up to 40 percent chlorine may so be prepared and applied.

Various other additives may likewise be incorporated into the foam formulation. For example, dyes and pigments may be incorporated to color the foam products. Fillers, such as clays, calcium carbonates, fibrous materials and the like may be added to reduce the cost and improve strength properties of the foams.

The foam products of this invention may be prepared either continuously or by a batch process. In the foaming process, as the exothermic reaction between the polyol and the polyisocyanate progresses, sufficient heat is evolved to volatilize the blowing agent and expand the reaction mixture. Depending upon the foaming technique employed, the foam mixture is then allowed to expand in place or is poured onto a conveyor or into suitable molds where expansion and curing of the cellular product is completed.

With regard to the procedure for mixing the foam ingredients, the chlorine and antimony-containing polyol composition of this invention is particularly adapted to "one-shot" foaming techniques as presently practiced, wherein the polyol and polyisocyanate components, as well as the other formulation ingredients as outlned above, are mixed and then foamed in one operation. However, because of its catalytic activity in rapidly initiating the polyol-polyisocyanate cross-linking reaction, the polyol composition generally cannot be adapted to prepolymer preparations which involve mixing a portion, or the entire amount of the hydroxyl-containing component with varying quantities of the polyisocyanate component at some time substantially prior to the foaming operation. Other prepolymers may nevertheless be employed herein in which polyols other than the catalytic composition of this invention are employed. Of course, the chlorine and antimony-containing polyol composition can be thoroughly admixed with the surfactant and blowing agent at any time prior to foaming.

Depending upon the particular foam formulation employed and the quantity of antimony incorporated therein, the time required to convert the foam mixture to the fully expanded foam product may vary appreciably as, for example, in a time period varying from about 10 seconds up to about 10 minutes. Thereafter the expanded foam material is typically air cured for about 30 minutes before it is stored or used.

The flame-resistant urethane foam products of this invention are thermosetting, cellular materials of varying density. They possess good dimensional stability, low thermal conductivity and excellent resistance to water absorption and to chemical attack. They are permanently flame-resistant materials as determined by standard test procedures. These foams are particularly useful as insulators against the transmission of heat, sound or moisture in various types of construction, in electrical equipment and appliances, etc. and as packing insulation against vibration and mechanical shock. Materials of this type have gained wide acceptance in industry.

For the preparation of different types of urethane plastic moldings, mixtures containing polyisocyanates and polyol compositions such as described hereinabove, are poured into suitable molds and allowed to cure. Substantially anhydrous conditions are maintained throughout the casting procedures.

For use in preparing flame-retardant coating products, the chlorine and antimony-containing polyol composition should have an hydroxyl number generally within the range of 25 to 250. Suitable compositions are prepared from monomeric and polymeric polyols having from 2 to 3 functional hydroxyl groups per molecule. In practice, the polyol composition is mixed with a quantity of polyisocyanate, i.e., diisocyanate, that provides in the mixture an excess of isocyanate groups. The resulting mixture is then dissolved in an organic solvent such as xylene, ethyl acetate, toluene, ethylene glycol, monoethylether acetate, and the like and is applied to the substrate by any suitable method such as by dipping, brushing, roller coating, spraying, etc. These products are particularly useful as protective and flame-retardant coatings for materials such as wood, cloth, metal and paper.

In order that those skilled in the art may better understand the present invention and the preferred methods by which it may be practiced, the following specific examples are offered. In these examples and elsewhere herein, where proportions of ingredients are expressed in parts, such proportions are by weight.

EXAMPLE 1

Part A.—Preparation of the chlorine and antimony-containing polyol composition

A two-liter, three-necked, round-bottom flask is equipped with a thermometer, a mechanical stirrer, a trap fitted to a reflux condenser, a heating mantle and nitrogen inlet and outlet tubes. The following materials are charged to the flask and blended together with agitation, while purging the flask with nitrogen:

Chlorinated propylene trimer [1] ___ 343.4 g. (0.85 mol).
Oxypropylated sorbitol (OH number=490) _____ 552.0 g. (0.8 mol).
Oxypropylated sorbitol (OH number=650) _____ 636.0 g. (1.2 mol).
Antimony trioxide _____ 46.8 g. (0.16 mol).

[1] Contains about 70% chlorine, by weight.

The agitating mixture is then slowly heated to a temperature of 180° C. under a nitrogen blanket. The reaction is conducted for about 2 hours, during which time period the reaction mixture darkens, the suspended antimony trioxide disappears and a clear product solution is formed. After cooling, the reaction product is poured into a suitable container. It has a hydroxyl number of 380, as determined by the method outlined in Siggia, S. "Quantitative Organic Analysis via Functional Groups," 2nd edition, Wiley and Sons, Inc., page 9 (1958). The product contains 15.23 percent combined chlorine and 2.47 percent antimony, by weight.

Part B.—Production of rigid urethane foam

A formulation is prepared, employing 100 parts of the polyol product of Part A of this example, 2 parts of L-5310 silicone oil (marketed by Union Carbide), 30 parts of trichlorofluoromethane blowing agent and 0.75 part of $H_2O$. These ingredients are blended together at room temperature until a homogeneous solution is obtained. One-hundred-ten parts of crude diphenylmethane 4,4'-diisocyanate (such as Mondur MR manufactured by Mobay Chemical) is then added and rapidly mixed into the above solution. The foam mixture is quickly poured into a suitable mold wherein expansion of the mix is effected in about 75 seconds. The finished foam has a density of 2.12 pounds per cubic foot, a uniformly fine closed-cell structure and a compressive strength of 25 pounds per square inch. Tested for flame-resistance in accordance with ASTM D 1692–59T, the foam is classified as non-burning.

A solution prepared as above containing the polyol, the silicone oil and blowing agents was stored in a closed container for one month at room temperature. At the end of this period, no apparent separation of the components was observed. Foam products with essentially the same physical characteristics to those described above may be prepared from this solution.

EXAMPLE 2

Following the general procedure as outlined in Part A of Example 1, a polyol is prepared employing 276 g. (0.4 mol) of an oxypropylated sorbitol having an hydroxyl number of 490, 318 g. (0.6 mol) of an oxypropylated sorbitol having an hydroxyl number of 650, 202 g. (0.5 mol) of the chlorinated propylene trimer used in Example 1 and 27.2 g. (0.08 mol) of antimony trisulfide. The reaction mixture is heated to a temperature of 150° to 160° C. and then maintained within this temperature range for 1.5 hours. The clear fluid polyol product obtained has a viscosity of 3460 cps. as measured at 25° C. with a Brookfield Viscometer, RV Model, using a #6 spindle, operated at 50 r.p.m. This polyol product has an hydroxyl number of 411, and contains, by weight, 17.3 percent chlorine and 2.45 percent antimony.

To prepare a rigid urethane foam product, the procedure as outlined in Part B of Example 1 is followed. One-hundred parts of the polyol product of this example, 2.5 parts of DC–201 silicone oil (marketed by Dow Corning Corp.) and 32.4 parts of trichlorofluoromethane blowing agent are blended together until a homogeneous solution is obtained. One-hundred-one and six-tenths parts of crude diphenylmethane 4,4'-diisocyanate is then added and blended into this solution. The foam mixture is poured into a suitable mould and expands to maximum height in 254 seconds. The expanded foam is completely cured in 10 minutes. Of uniformly fine closed-cell structure, this product has a density of 1.43 pounds per cubic foot. It is non-burning when tested in accordance with the ASTM D–1692 flammability test.

EXAMPLE 3

Following the general procedure as outlined in Part A of Example 1, a polyol is prepared employing 690 g. (1.0 mol) of an oxypropylated sorbitol having an hydroxyl number of 490, 202 g. (0.5 mol) of the chlorinated propylene timer as used in Example 1 and 23.4 g. (0.08 mol) of antimony trioxide. The reaction is conducted at a temperature of 180° to 186° C. for 2½ hours. The fluid polyol product recovered has an hydroxyl number of 302, and contains, by weight, 15.47 percent chlorine and 2.13 percent antimony.

One-hundred parts of the polyol product is mixed with two parts L–5310 silicone oil and thirty-two parts of trichlorofluoromethane. Seventy-eight parts of crude diphenylmethane 4,4'-diisocyanate is then blended into the resulting solution as described in Example 1. The foam mixture expands to its maximum height in about 85 seconds. A uniformly fine, closed-cell foam product having a density of 1.66 pounds per cubic foot is obtained. When tested for flame-resistance (ASTM D 1692–59T), it is non-burning.

EXAMPLES 4–7

These examples illustrate the use of different polyisocyanates to prepare the flame-resistant foam products of this invention. A polyol composition is prepared following the general procedure as outlined in the previous examples, by reacting the following ingredients at 180° to 183° C. for 2½ hours:

|   | G. |
|---|---|
| Oxypropylated sorbitol (OH number=490) | 552 |
| Oxypropylated sorbitol (OH number=650) | 636 |
| Chlorinated propylene trimer [1] | 404 |
| Antimony trioxide | 46.8 |

[1] Chlorine content=70% by weight.

The polyol product has an hydroxyl number of 347, a chlorine content of 17.22 percent, by weight, and an antimony content of 2.38 percent, by weight.

To prepare the foam products, the polyol is first formulated with ingredients as described previously, the solutions so prepared being designated in the following table as component A of the foam mixture. The polyisocyanates or mixtures thereof are designated as component B. The foams are prepared as previously described. Foam rise times and the density of the finished foam are included for each example.

TABLE I

| Example | 4 | 5 | 6 | 7 |
|---|---|---|---|---|
| Component A: | | | | |
| Polyol Product, parts | 100 | 100 | 100 | 100 |
| L–5310 Silicone Oil, parts | 2 | 2 | 2 | |
| DC–201 Silicone, parts | | | | 1.5 |
| $H_2O$, parts | 1 | 1 | | |
| Trichlorofluoromethane, parts | 30 | 30 | 35 | 30 |
| Component B: | | | | |
| PAPI,[1] parts | 82 | | | 89 |
| Nacconate 4040,[2] parts | 18 | 18 | 70 g. | |
| Mondur MR, parts | | | 82 | |
| Foam Rise Time, seconds | 117 | 132 | | 80 |
| Density, pounds per cubic foot | 1.34 | 1.31 | 1.50 | 1.93 |

[1] Polymethylene polyphenyl isocyanate (Carwin Co.).
[2] Crude toluene diisocyanate manufactured by Allied Chemical.

The finished foams are of uniformly fine closed-cell structure and exhibit non-burning characteristics tested according to ASTM D 1692–59T.

EXAMPLE 8

A chlorine- and antimony-containing polyol is prepared following the same general procedure as outlined in Example 1. The oxypropylated sorbitol and chlorinated propylene trimer ingredients used in Example 2 are employed in this example in the same proportions. In place of the antimony trisulfide, however, 26.7 g. (0.08 mol) of potassium antimonyl tartrate $(K(SbO)C_4H_4O_6 \cdot \frac{1}{2}H_2O)$ is employed. The reaction is conducted at a temperature of 168° to 175° C. for 2½ hours, during which time period the suspended antimony compound disappears and a clear fluid product is obtained. This product has a viscosity of 49,600 cps. at 25° C. (Brookfield Viscometer—RV Model; #6 Spindle at 10 r.p.m.). It has a hydroxyl number of 383 and contains, by weight, 16.3 percent chlorine and 1.2 percent antimony.

A foam formulation is prepared by first blending, for each 100 parts of this polyol product, 2.5 parts of DC–201 silicone oil and 32.4 parts of trichlorofluoromethane blowing agent. To the resulting homogeneous solution, 94.4 parts of diphenylmethane 4,4'-diisocyanate is then added for each 100 parts of incorporated polyol. The diisocyanate is quickly mixed into the solution and the foam mixture is then poured into molds wherein it expands and reaches maximum height in 363 seconds. The finished cured foam has a density of 1.71 pounds per cubic foot and is predominantly of medium cell structure. Tested for flammability, as described previously, it is rated as non-burning.

EXAMPLES 9–11

Following the general procedure as outlined in previous examples, polyol compositions incorporating varying percentages of antimony are prepared as follows:

TABLE II

| Example | 9 | 10 | 11 |
| --- | --- | --- | --- |
| Oxypropylated sorbitol (OH number=650), parts | 416 | 419 | |
| Oxypropylated sorbitol (OH number=490), parts | 362 | 365 | 580 |
| Glycerol, parts | | | 116 |
| Chlorinated propylene trimer,[1] parts | 198.4 | 200 | 255 |
| Antimony trioxide, parts | 23.6 | 16.0 | 49 |
| Hydroxyl number of product | 381 | 379 | 394 |
| Chlorine content, percent by weight | 13.9 | 14.0 | 17.8 |
| Antimony content, percent by weight | 1.97 | 1.33 | 4.09 |

[1] Contains about 70 percent chlorine, by weight.

Foam products are prepared from the polyols as described previously. Formulations used, foaming time (rise time) and properties of the resultant foam products are as follows:

TABLE III

| Example | 9 | 10 | 11 |
| --- | --- | --- | --- |
| Component A: | | | |
| Polyol product, parts | 100 | 100 | 100 |
| L–5310 silicone oil, parts | 2 | 2 | 2 |
| Trichlorofluoromethane, parts | 24 | 24 | 25 |
| Component B: | | | |
| Component B: Mondur MR, parts | 97 | 97 | 102 |
| Rise Time, seconds | 85 | 270 | 28 |
| Foam Density, pounds per cubic foot | 2 | 1.73 | 1.86 |
| Flammability (ASTM D 1692–59T) | (¹) | (¹) | (¹) |
| Compressive Strength, p.s.i. | 40 | 33 | |
| K-Factor, B.t.u./hr./ft.²/° F./in. | 0.127 | | |

[1] Non-burning.

The above data indicate that variations are effected in the foam reaction, e.g., rise times, by varying the percentage of antimony in the polyol composition.

EXAMPLE 12

A polyol composition is prepared by reacting at 180° to 185° C. for 3 hours, 404 g. of the chlorinated propylene trimer employed in previous examples, 900 g. of a commercial polymeric tetrol having an average molecular weight of 450 and an hydroxyl number of 550, and 46.8 g. of antimony trioxide. The polyol product recovered is a clear syrupy liquid, brownish in color, having an hydroxyl number of 290. It contains, by weight, 15.76 percent chlorine and 2.89 percent antimony.

A rigid urethane foam of uniformly fine closed-cell structure is prepared by blending together 100 parts of the polyol product described above, 32 parts trichlorofluoromethane, 2 parts L–5310 silicon oil and 75 parts of crude diphenylmethane 4,4'-diisocyanate. The resulting foam mix expands to its maximum height in 144 seconds. The foam product has a density of 1.63 pounds per cubic foot and exhibits non-burning characteristics.

EXAMPLE 13

Following the general procedure as described in previous examples, a polyol composition is prepared by reacting at 158° to 162° C. for 2 hours, 276 g. of an oxypropylated sorbitol having an hydroxyl number of 490, 318 g. of an oxypropylated sorbitol having an hydroxyl number of 650, 202 g. of the chlorinated propylene trimer used in the previous examples and 31.5 g. of tris(2-chloropropyl)antimonite. This antimonite is prepared by reacting propylene oxide with antimony chloride according to the method described in Canadian Patent 632,627 issued Dec. 12, 1961. Volatile secondary reaction products are collected during the reaction. Upon analysis, this distillate is found to be predominantly water and 2-chloropropanol (boiling point: 133°–134° C.). The clear, fluid polyol product recovered has an hydroxyl number of 408 and a Brookefield viscosity of 43,900 cps. at 25° C. It contains 17.8 percent chlorine, by weight and 1.2 percent antimony, by weight.

A foam formulation is prepared by first blending 100 parts of the polyol product with 2.5 parts of DC–201 silicone and 32.4 parts of trichlorofluoromethane blowing agent and then blending 100.8 parts of Mondur MR into the homogenous solution obtained. The resulting foam mixture is poured into molds wherein it expands to maximum height in 158 seconds. After curing, the finished foam has a density of 1.81 pounds per cubic foot. Of uniformly fine, closed-cell structure, it is non-burning when tested as previously described.

EXAMPLE 14

Following the general procedure as outlined in Example 1, a polyol is prepared by reacting the following ingredients at a temperature of 180° to 182° C. for 2.5 hours:

| | G. |
| --- | --- |
| Chlorinated isobutylene polymer[1] | 404 |
| Oxypropylated sorbitol (OH number=650) | 552 |
| Oxypropylated sorbitol (OH number=490) | 636 |
| Antimony trioxide | 46.8 |

[1] Contains 70 percent chlorine, by weight.

The fluid polyol product recovered has an hydroxyl number of 357 and contains, by weight, 16.83 percent chlorine and 1.87 percent antimony.

One-hundred parts of this product is blended with 32 parts of trichlorofluoromethane, 2 parts of L–5310 silicone oil and 92 parts of crude diphenylmethane 4,4'-diisocyanate. The foam mix is poured into suitable molds and expands to its maximum height in 71 seconds. The finished, cured rigid urethane foam product with a fine closed-cell structure has a density of 1.73 pounds per cubic foot. It exhibits non-burning characteristics as determined by standard test procedures.

EXAMPLES 15–20

Following the procedure as previously outlined, polyol compositions are prepared employing as the chlorine-supplying component, different chlorinated substantially linear alkanes and a chlorinated cyclic alkadiene as listed in the table below. For each preparation, the oxypropylated sorbitols described in Example 2 are used in the same proportions as in Example 2 and 23.4 g. antimony trioxide is employed. During each reaction, the antimony trioxide suspended in the reaction mixture disappears and a clear fluid product is produced. The reaction conditions, the hydroxyl number, Brookefield viscosity and composition of the polyol products are as follows:

(OH number=490), 2 parts of L-5310 silicone oil, and 32 parts of trichlorofluoromethane. Seventy-nine parts of crude diphenylmethane 4,4'-diisocyanate is then rapidly blended into the resulting solution. The foam mixture is poured into suitable molds wherein it expands to maximum height in 182 seconds. The foam product obtained has a density of 1.71 pounds per cubic foot. It exhibits non-burning characteristics.

TABLE IV

| Chlorinated Component | Example |  |  |  |  |  |
|---|---|---|---|---|---|---|
|  | 15 | 16 | 17 | 18 | 19 | 20 |
| 97-99% normal paraffins: |  |  |  |  |  |  |
| $C_{14}$-$C_{16}$ chain length, 55.8% $Cl_2$, g | 202 |  |  |  |  |  |
| $C_{14}$-$C_{16}$ chain length, 51.3% $Cl_2$, g |  | 202 |  |  |  |  |
| $C_9$-$C_{13}$ chain length, 57.5% $Cl_2$, g |  |  | 202 |  |  |  |
| $C_9$-$C_{13}$ chain length, 58.8% $Cl_2$, g |  |  |  | 202 |  |  |
| 85-90% normal paraffin: |  |  |  |  |  |  |
| $C_{22}$-$C_{28}$ chain length, 39-42% $Cl_2$, g |  |  |  |  | 202 |  |
| Hexachlorocyclopentadiene, g |  |  |  |  |  | 202 |
| Reaction Temperature, °C | 165-175 | 160-175 | 168-175 | 165-175 | 171-173 | 165-176 |
| Reaction Time, hrs | 10 | 8.5 | 12.5 | 11.5 | 12.0 | 3.5 |
| OH number, polyol | 420 | 451 | 437 | 426 | 409 | 371 |
| Viscosity, P at 25°C.[1] | 26.6 | 17.9 | 13.1 | 33.8 | 18.8 | 8.8 |
| Chlorine content, percent/wt | 14.8 | 11.8 | 15.0 | 16.0 | 13.1 | 19.5 |
| Antimony content, percent/wt | 2.5 | 2.1 | 2.1 | 2.6 | 2.6 | 2.45 |

[1] Determined on Brookfield Viscometer, RV Model, #6 spindle at 10 r.p.m.

EXAMPLES 21-26

Employing the polyol products of Examples 15-20 above, foam formulations are prepared. For each foam mixture, 100 parts of the particular polyol is first blended with the surfactant and blowing agent as previously described, after which the diisocyanate is added to the blended solution. The foam formulations, the foam rise (expansion) times and the density of the finished foams are as follows:

EXAMPLE 28

Following the general procedure as outlined in previous examples, a polyol is prepared by reacting 300 g. of polypropylene Glycol 150 (marketed by Union Carbide Chemicals), 404 g. of the chlorinated propylene trimer used previously and 23.4 g. and antimony trioxide. In the reaction, these materials are heated at 180° C. for 3½ hours. The polyol product recovered has an hydroxyl number of 162.

TABLE V

|  | Example |  |  |  |  |  |
|---|---|---|---|---|---|---|
|  | 21 | 22 | 23 | 24 | 25 | 26 |
|  | Polyol |  |  |  |  |  |
|  | Product of Example 15 | Product of Example 16 | Product of Example 17 | Product of Example 18 | Product of Example 19 | Product of Example 20 |
| DC-201 Silicone oil, parts | 2.5 | 2.5 | 2.5 | 2.5 | 2.5 | 2.5 |
| Trichlorofluoromethane, parts | 26.8 | 28.8 | 27.3 | 27.0 | 26.5 | 25.1 |
| Mondur MR [1], parts | 103.8 | 111.4 | 108.0 | 105.3 | 101.1 | 90.9 |
| Foam Rise Times, seconds | 94 | 111 | 94 | 99 | 143 | 102 |
| Density, pounds per cubic foot | 2.26 | 2.13 | 2.01 | 2.19 | 2.12 | 1.91 |

[1] Crude diphenylmethane 4,4'-diisocyanate (Mobay Chemical).
The foam products of these examples are all of uniformly fine closed-cell structure. Each exhibits non-burning characteristics when tested according to ASTM D 1692-59T.

The foam products of these examples are all of uniformly fine closed-cell structure. Each exhibits non-burning characteristics when tested according to ASTM D 1692-59T.

EXAMPLE 27

This example illustrates that a polyol composition of this invention is completely miscible with conventional polyols, and can thus be blended to produce desired end properties.

A polyol composition having an hydroxyl number of 181, a chlorine content of 26.97 percent, by weight, and an antimony content of 3.73 percent, by weight, is prepared by reacting 690 g. of an oxypropylated sorbitol (having an hydroxyl number of 490), 804 g. of an oxypropylated sorbitol having an hydroxyl number of 650, 1010.0 g. of a chlorinated propylene trimer (70 percent chlorine, by weight) and 117 g. of antimony trioxide. The reaction is conducted for a period of 2 hours at 180° C. following the general procedure as outlined in Example 1.

Two-hundred-forty-eight parts of the polyol product is blended with 172.5 parts of an oxypropylated sorbitol The polyol product is diluted with a 1:1 solvent mixture of xylene and Cellosolve Acetate (manufactured by Union Carbide Chemicals). Sufficient toluene diisocyanate (such as Hylene TM, manufactured by the E. I. du Pont de Nemours Company) is added to the polyol solution to give an isocyanate to hydroxyl equivalent ratio of 1.08 to 1. The solids content of the final solution is 50 percent, by weight.

The prepared solution is applied to a steel panel and allowed to cure at room temperature. This coating dries tack-free in 1½ hours.

EXAMPLE 29

A polyol composition is prepared by reacting the following ingredients at 150° to 155° C. for 3 hours:

|  | G. |
|---|---|
| Oxypropylated sucrose (OH number=450) | 1200 |
| Chlorinated propylene trimer | 200 |
| Antimony trioxide | 35 |

During the reaction, the mixture is azeotropically dried by refluxing with toluene. The solvent is then removed from the product by vacuum stripping. The polyol composition recovered has an hydroxyl number of 338.

This polyol is mixed with a prepolymer having an excess isocyanate content of 29 percent, which contains an oxypropylated sorbitol and toluene diisocyanate. The polyol and prepolymer are blended in amounts providing in the mixture a ratio of isocyanate to hydroxyl equivalent of 1.02:1. The prepared mixture is poured into suitable molds wherein it cures to a hard, tough casting in approximately 5 minutes.

What is claimed is:

1. A liquid polyether polyol composition having a hydroxyl number within the range of 25 to 600 which consists essentially of the condensation reaction product of from 0.5 to 1 mol of at least one organic compound containing from about 39 to 72 percent, by weight of chlorine, which is selected from the group consisting of chlorinated linear alkanes of $C_9$–$C_{28}$ chain length, chlorinated olefins and cycloolefins of 3–5C and chlorinated cyclic diolefins of 5–6C; one mol of at least one polyhydroxy compound having a hydroxyl number of 150–650; and from 0.08 to 0.1 mol of a trivalent antimony compound selected from the group consisting of antimony trioxide, antimony trisulfide, antimonyl derivatives of metallic and ammonium salts of aliphatic, alpha-hydroxy monobasic or polybasic organic acids and antimonous acid ester products from the reaction between an alkylene oxide or an organic hydroxy compound of 2–8C with antimony trichloride or antimony trioxide.

2. The composition of claim 1 which contains, by weight, from 2 percent up to 30 percent chlorine and from 0.1 percent up to about 12 percent antimony.

3. The composition of claim 1 in which the organic chlorine-containing compound is a chlorinated, predominantly normal paraffinic hydrocarbon.

4. The composition of claim 1 in which the organic chlorine-containing compound is a chlorinated propylene trimer or a chlorinated isobutylene polymer which contains about 70 percent chlorine, by weight.

5. The composition of claim 1 in which the organic chlorine-containing compound is hexachlorocyclopentadiene.

6. The composition of claim 1 in which the organic polyhydroxy compound is selected from the group consisting of branch-chain and linear polyether polyols having at least one ether linkage and at least two functional hydroxyl groups per molecule and mixtures thereof.

7. The composition of claim 1 in which the trivalent antimony compound is antimony trioxide.

8. The composition of claim 1 in which the trivalent antimony compound is potassium antimonyl tartrate.

9. The composition of claim 1 in which the trivalent antimony compound is an antimonous acid ester which is tris(2-chloropropyl)antimonite.

10. The composition of claim 6 in which the polyether polyol is a branch-chain polyether polyol formed by the condensation of an alkylene oxide with a polyhydroxy aliphatic compound having at least three hydroxyl groups per molecule.

11. The composition of claim 6 in which the linear polyether polyol is a polyalkylene ethere glycol formed by the reaction of an alkylene oxide of 2–4C with an alkylene glycol.

12. The process for preparing a liquid polyether polyol composition having a hydroxyl number within the range of 25 to 600 which comprises simultaneously reacting, at a temperature of 100° to 225° C. and for a period of 1 to 16 hours, from 0.5 to 1 mol of at least one organic compound containing, by weight, from about 39 to 72% chlorine; 1 mol of at least one organic polyhydroxy compound having a hydroxyl number of 150–650; and from 0.08 to 0.1 mol of a trivalent antimony compound selected from the group consisting of antimony trioxide, antimony trisulfide, antimonyl derivatives of metallic and ammonium salts of aliphatic, alpha-hydroxy monobasic or polybasic organic acids and antimonous acid ester products of the reaction between an epoxide or an organic hydroxy compound with antimony trichloride or antimony trioxide, the said antimony compound being mixed uniformly into the reaction mixture with agitation; continuing the reacton until the antimony is converted into a chemically combined form in the reaction mixture; and thereafter recovering the liquid chlorine and antimony-containing polyether polyol composition.

13. The process of claim 12 in which the reaction temperature is within the range of 120° to 200° C.

14. The process of claim 12 in which the organic chlorine-containing compound is selected from the group consisting of chlorinated alkanes of $C_9$–$C_{28}$ chain length, chlorinated olefins and cycloolefins of 3–5C and chlorinated cyclic diolefins of 5–6C.

15. The process of claim 12 in which the organic chlorine-containing compound is a chlorinated predominantly normal paraffinic hydrocarbon.

16. The process of claim 12 in which the organic chlorine-containing compound is a chlorinated propylene trimer or a chlorinated polyisobutylene polymer which contains about 70 percent chlorine, by weight.

17. The process of claim 12 in which the organic chlorine-containing compound is hexachlorocyclopentadiene.

18. The process of claim 12 in which the antimony compound is antimony trioxide.

19. The process of claim 12 in which the organic polyhydroxy compound is selected from the group consisting of branch-chain and linear polyether polyols having at least one ether linkage and at least two functional hydroxyl groups per molecule and mixtures thereof.

20. The process of claim 19 in which the polyether polyol is a branch-chain polyether polyol obtained from the reaction of an alkylene oxide with a polyhydroxy aliphatic compound having at least three functional hydroxyl groups per molecule.

21. The process of claim 19 in which the linear polyether polyol is a polyalkylene ether glycol produced by condensing an alkylene oxide of 2–4C with an alkylene glycol.

22. The process of claim 20 in which the branch-chain polyether polyol is the reaction product of propylene oxide and a hexol.

References Cited

UNITED STATES PATENTS

| | | | |
|---|---|---|---|
| 2,473,735 | 6/1949 | Solomon | 260—446 |
| 2,647,910 | 8/1953 | Archer et al. | 260—446 |
| 3,075,927 | 1/1963 | Lanham | 260—2.5 |
| 3,075,928 | 1/1963 | Lanham | 260—2.5 |
| 3,121,067 | 2/1964 | Nelson | 202—8.1 |
| 3,164,558 | 1/1965 | Eichhorn | 202—8.1 XR |
| 3,271,344 | 9/1966 | Lowes | 202—8.1 XR |
| 3,359,218 | 12/1967 | Wiles | 260—446 XR |

MAYER WEINBLATT, *Primary Examiner.*

U.S. Cl. X.R.

260—2.5, 446; 106—17